US008832119B2

(12) United States Patent
Girgensohn et al.

(10) Patent No.: US 8,832,119 B2
(45) Date of Patent: Sep. 9, 2014

(54) SYSTEMS AND METHODS FOR ORGANIZING FILES IN A GRAPH-BASED LAYOUT

(75) Inventors: Andreas Girgensohn, Palo Alto, CA (US); Frank Shipman, III, College Station, TX (US); Lynn Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1075 days.

(21) Appl. No.: 12/137,718

(22) Filed: Jun. 12, 2008

(65) Prior Publication Data
US 2009/0313267 A1 Dec. 17, 2009

(51) Int. Cl.
| | |
|---|---|
| G06F 7/00 | (2006.01) |
| G06F 17/30 | (2006.01) |
| G06K 9/62 | (2006.01) |
| G06F 3/048 | (2013.01) |
| G09G 5/00 | (2006.01) |
| G06K 9/54 | (2006.01) |
| G06K 9/60 | (2006.01) |

(52) U.S. Cl.
USPC ........... 707/749; 707/737; 707/805; 707/821; 707/999.003; 707/999.006; 382/225; 382/305; 715/764; 715/769; 345/619

(58) Field of Classification Search
None
See application file for complete search history.

(56) References Cited

U.S. PATENT DOCUMENTS

| | | | | |
|---|---|---|---|---|
| 5,801,699 A | * | 9/1998 | Hocker et al. ................ | 715/837 |
| 6,347,313 B1 | * | 2/2002 | Ma et al. ....................... | 707/711 |
| 6,742,003 B2 | * | 5/2004 | Heckerman et al. .......... | 398/189 |
| 6,768,816 B2 | * | 7/2004 | Hall et al. ..................... | 382/229 |
| 6,798,911 B1 | * | 9/2004 | Jafarkhani et al. ............ | 382/225 |
| 6,853,389 B1 | * | 2/2005 | Ikeda ............................ | 715/790 |
| 7,028,050 B1 | * | 4/2006 | Rose ......................... | 707/104.1 |
| 2003/0179236 A1 | * | 9/2003 | Good et al. ................... | 345/764 |
| 2006/0106764 A1 | * | 5/2006 | Girgensohn et al. ............. | 707/3 |
| 2007/0244925 A1 | * | 10/2007 | Albouze ..................... | 707/104.1 |
| 2008/0172628 A1 | * | 7/2008 | Mehrotra et al. ............. | 715/771 |

OTHER PUBLICATIONS

M. Chang et al., "Collection Understanding", Proceedings of the ACM/IEEE Joint Conference on Digital Libraries, pp. 334-342, 2004.

D. Cutting et al., "Scatter/Gather: A cluster-based approach to browsing large document collections", Proc. ACM SIGIR '92, pp. 318-329, 1992.

(Continued)

Primary Examiner — Ajay Bhatia
Assistant Examiner — Cheryl M Shechtman
(74) Attorney, Agent, or Firm — Sughrue Mion, PLLC

(57) ABSTRACT

An adaptive, interactive visual workspace for viewing groups of files based on their relationships. Relationships of files are visualized using iterative refinement of categories through a direct-manipulation graph-based layout. The visual workspace starts with a fully connected graph linking thumbnail images of related files that is then partitioned into neighborhoods in response to a user creating file stacks corresponding to different categories. Normalized spring lengths improve the overall quality of the layout. Different modes for membership in neighborhoods avoid confusing motion of files and help a user to manually organize the workspace. Additionally, retrieved files can be added without having to significantly move the previous files. Different visualization techniques indicate which files are related to each other. Different zoom rates are used for file location, and surrogate sizes allow users to increase the separation between files while still increasing the surrogate sizes.

21 Claims, 9 Drawing Sheets

(56) References Cited

OTHER PUBLICATIONS

J.S. Donath, "Visual Who: Animating the Affinities and Activities of an Electronic Community", Proceedings of the Third ACM International Conference on Multimedia, New York: ACM Press, pp. 99-107, 1995.

M. Dontcheva et al., "Metadata Visualization for Image Browsing", UIST 2005 Demonstration, 2005.

T. Kohonen, Self-Organizing Maps (Third Edition), Berlin: Springer-Verlag, 2001.

K. A. Olsen et al., "Visualization of a Document Collection: The VIBE System", Information Processing & Management, 29(1): 69-82, 1993.

* cited by examiner

SYSTEMS AND METHODS FOR ORGANIZING FILES IN A GRAPH-BASED LAYOUT

BACKGROUND OF THE INVENTION

1. Field of the Invention

The present invention relates to systems and methods for organizing files in an interactive, adaptive graph-based layout, and more specifically to systems and methods for organizing files in an interactive visual workspace using stacking and grouping based on similarity measures.

2. Background of the Invention

A basic type of interaction with photographs is to organize them into groups based on the relationships between photos. Working with large collections of images is part of a wide range of tasks that include selecting photos from on-line repositories, organizing personal and shared photo collections, and attaching metadata or tagging images in a digital library. Most interfaces for such tasks present some form of a list or grid of thumbnails, such as the image search results for Google® and Flickr® and the browsing interfaces for Picasa® and Microsoft® Windows Explorer. In addition to images, other documents can be organized in a similar fashion as long as they have thumbnail representations that allow users to distinguish them from each other.

However, existing organization systems limit the presentation of material to a grid-based display, which is too rigid to depict relationships properly. Additionally, when depicting files as nodes and connecting the nodes based on their relationships, it is often desired to pin certain nodes at certain locations to organize different classes of files. Unpinned nodes may have a short desired distance to more than one pinned node. If those pinned nodes are far apart, the unpinned photos will pile up along the straight line between the two pinned nodes, inaccurately depicting the actual similarity to both nodes in an effort to depict the similarity to both nodes.

Finally, many systems for organizing and visualizing files do not permit a user to manually implement additional organization rules or override existing rules. A user is often stuck with the organization scheme configured by a software-based system.

Thus, it is desired to develop systems and methods for organizing files in a graph-based layout that provides greater flexibility and manual input by a user.

SUMMARY OF THE INVENTION

The present invention relates to systems and methods for viewing groups of files based on their relationships in an adaptive, interactive graph-based visual workspace. Relationships of files are visualized using iterative refinement of categories through a direct-manipulation graph-based layout. The visual workspace starts with a fully connected graph linking thumbnail images of related files that is then partitioned into neighborhoods in response to a user creating file stacks corresponding to different categories. Normalized spring lengths improve the overall quality of the layout. Different modes for membership in neighborhoods avoid confusing motion of files and help a user to manually organize the workspace. Additionally, retrieved files can be added without having to significantly move the previous files. Different visualization techniques indicate which files are related to each other. An elliptical-shaped window displaying rings of elliptic thumbnail images presents a group of files in an easily visible and space-efficient way. Different zoom rates are used for file location, and surrogate sizes allow users to increase the separation between files while still increasing the surrogate sizes.

The present invention also relates to methods of organizing files in a graph-based visual workspace, comprising the steps of: loading a plurality of files into a visual workspace, wherein each file is represented by a thumbnail image; creating a graph-based layout of the files in the workspace, wherein the files are separated by a distance corresponding to their similarities with each other and connected by lines to similar files; defining at least one stack of files from at least one of the plurality of files; and forming a neighborhood of files surrounding at least one of the stacks of files.

In another aspect of the invention, the method further comprises connecting lines between files in a neighborhood and the stack of files in the neighborhood, such that files included in the neighborhood lose their connections to other files outside of the neighborhood.

In another aspect of the invention, the method further comprises selecting the files from a group consisting of images, videos or text-based documents.

In another aspect of the invention, the method further comprises calculating the distance between files using a distance measure based on a similarity measure.

In another aspect of the invention, the method further comprises calculating the graph layout using a spring model.

In another aspect of the invention, the method further comprises increasing the strengths of the springs attached to user-defined stacks.

In another aspect of the invention, the method further comprises forming the neighborhood by selecting a distance threshold to define which files are included within the neighborhood based on whether they are within the distance threshold.

In another aspect of the invention, the method further comprises modifying the distance threshold after the neighborhood has been created.

In another aspect of the invention, the method further comprises preventing files from leaving the neighborhood even when there is a more suitable neighborhood.

In another aspect of the invention, the method further comprises preventing files from leaving the neighborhood even when they are no longer within the distance threshold.

In another aspect of the invention, the method further comprises preventing files from entering the neighborhood even when they are within the distance threshold.

In another aspect of the invention, the method further comprises illustrating the similarities between neighborhoods.

In another aspect of the invention, the method further comprises illustrating similarities between neighborhoods where files within the similar neighborhoods could be members of either neighborhood.

In another aspect of the invention, the method further comprises illustrating the similarities using color-coded halos surrounding the neighborhood regions.

In another aspect of the invention, the method further comprises magnifying a section of the workspace to more clearly visualize the connections between the files in the section.

In another aspect of the invention, the method further comprises disproportionately increasing the distances between thumbnail images in comparison to the thumbnail image size when magnifying the section of the workspace.

In another aspect of the invention, the method further comprises organizing the thumbnail images of a stack into an elliptical window, and further shaping each thumbnail image into an elliptical shape within the elliptical window.

The present invention also relates to a system for organizing files in a graph-based visual workspace, comprising: a loading module for loading a plurality of files into a visual workspace, wherein each file is represented by a thumbnail image; a layout module for creating a graph-based layout of the files in the workspace; wherein the files are separated by a distance corresponding to their similarities with each other and connected by lines to similar files; a stack module for defining a stack of files from at least the plurality of files; and a neighborhood module for forming a neighborhood of files from one of the stacks of files, such that a file can only belong to one neighborhood.

In another aspect of the invention, the neighborhood module forms the neighborhood by selecting a distance threshold to define which files are included within the neighborhood based on whether they are within the distance threshold.

In another aspect of the invention, the neighborhood module modifies the distance threshold after the neighborhood has been created.

In another aspect of the invention, the neighborhood module prevents files from leaving the neighborhood even when there is a more suitable neighborhood.

In another aspect of the invention, the neighborhood module prevents files from leaving the neighborhood even when they are no longer within the distance threshold.

In another aspect of the invention, the neighborhood module prevents files from entering the neighborhood even when they are within the distance threshold.

The present invention also relates to a computer-program product embodied on a computer-readable medium for organizing files in a graph-based visual workspace, further, comprising computer code for: loading a plurality of files into a visual workspace, wherein each file is represented by a thumbnail image; creating a graph-based layout of the files in the workspace, wherein the files are separated by a distance corresponding to their similarities with each other and connected by lines to similar files; defining a stack of files from at least one of the plurality of files; and forming a neighborhood of files surrounding one of the stacks of files.

In another aspect of the invention, the computer-program product further comprises computer code for connecting lines between files in a neighborhood and the stack of files in the neighborhood, such that files included in the neighborhood lose their connections to other files outside of the neighborhood.

In another aspect of the invention, the computer-program product further comprises computer code for forming the neighborhood by selecting a distance threshold to define which files are included within the neighborhood based on whether they are within the distance threshold.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

Figure 1:
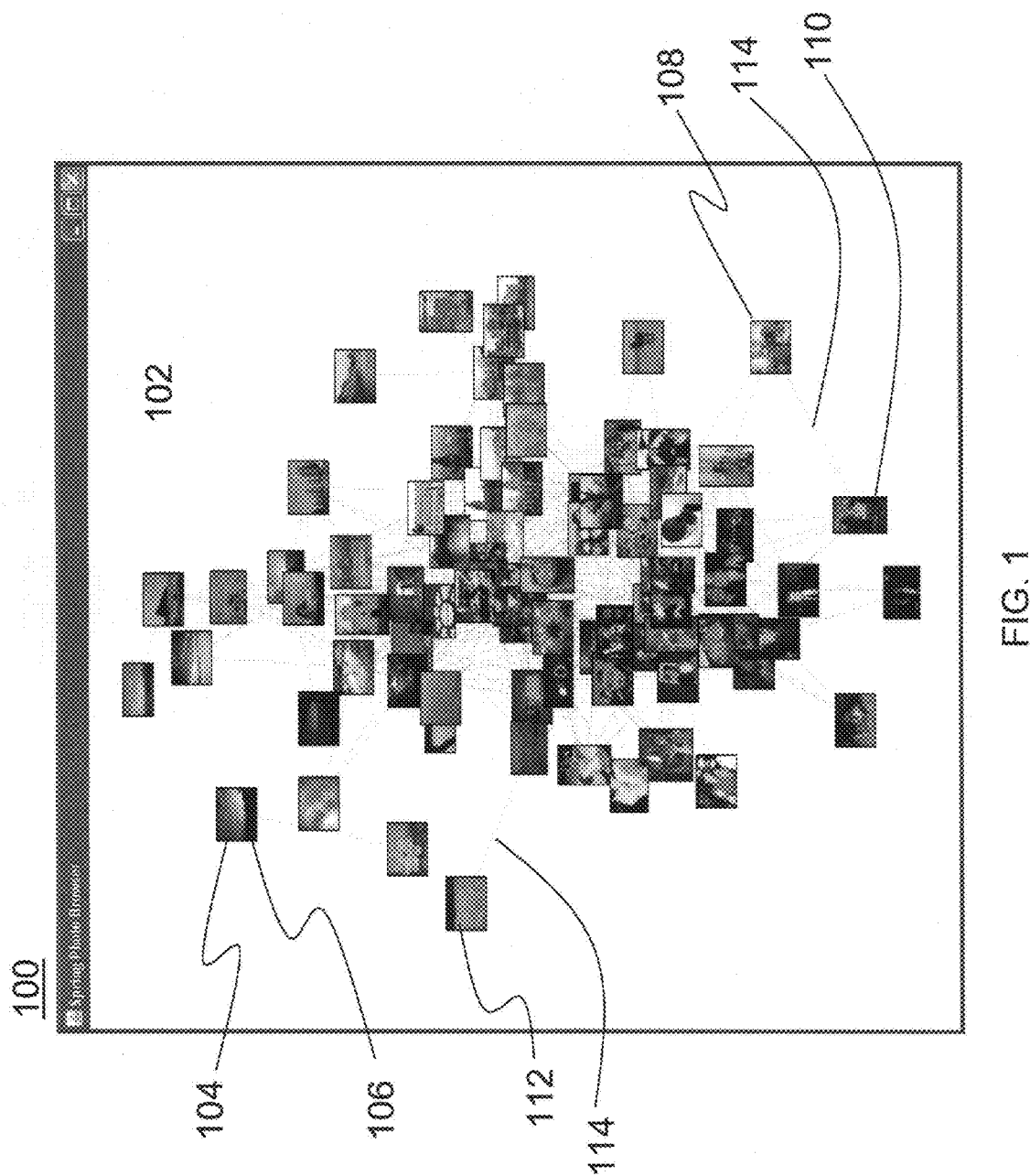
FIG. 1 depicts an initial layout of files represented by thumbnail images in a workspace, wherein the thumbnail images are arranged based on a distance measure, according to one aspect of the invention.

In the following detailed description, reference will be made to the accompanying drawing(s), in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

This invention concerns the design of an adaptive interactive visual workspace for organizing files that is supported by an iterative process. In one embodiment, the system places thumbnail images of related files, such as a group of photographs, near each other in an initial layout based on an analysis of similarity measures of the photos. The user can then group related photos into stacks. The system then pulls additional related photos into a neighborhood surrounding the stack for further consideration by the user. Users can choose among several criteria for determining related photographs that focus on visual, temporal, and geographic attributes.

Using this iterative process, users may find a collection of photos suitable for a particular presentation. This process is also well-suited for tagging photos to aid later retrieval.

In one embodiment, several similarity measures are used to determine how close photos wish to be to one another in the workspace when focusing on different photo attributes. A graph-based layout system with thumbnail images as graph nodes places photos in the workspace to minimize the differences between desired and actual distances between photos. When nodes are dragged to different locations in the workspace, related nodes follow according to similarity. Nodes can be pinned to particular locations such that only unpinned nodes can be moved by the graph layout.

In one aspect of the invention, users create stacks of photographs by dragging a photo onto another photo or an existing stack. The stack of photos is represented by a single node in the graph with its own desired distance to the other nodes in the network. The stack is visualized either by a photo selected from the stack or by a collage of several photos from the stack. Stacks may also have neighborhoods visualized by a halo, with the neighborhood containing photos related to the photos in the stack. For better separation, photos in the neighborhood of a stack are severed from the rest of the workspace such that a pinned photo and its neighborhood move, independently, without affecting the rest of the workspace.

In addition to photographs, this approach is applicable to other types of files and documents, including videos and text-based files. Other types of similarity such as text similarity are suited for text-based files. Thumbnail images represent the files in the workspace, regardless of the type of file.

In one embodiment, the separation of files within the workspace is determined using distance measures between the files. With a good distance measure, the system produces intuitive groupings of files. Users are engaged when interacting with the system. They are able to organize files in meaningful ways. Users have control over files in neighborhoods to manually adjust relationships of files when the system's analysis of file relationships is insufficient.

This invention provides a two-dimensional workspace that supports users in locating and organizing files, such as photographs. The workspace places related photographs near each other in two dimensions without being constrained to a grid. The user can choose among several similarity measures to find related photos. Users can pin photos at a particular location in the workspace, arrange photos into stacks, and move photos and stacks around the space. As the user moves individual photos or stacks, the system moves unpinned photos based on their similarity. The movement of unpinned photos, combined with visualizations of the relative ambiguity between stacks, provides users with the ability to organize their photos with the help of the system based on different similarity criteria. Users can also retrieve additional photos that are similar to a selected group of photos.

In one aspect, an initial layout is based on a similarity measure between photos based on a variety of photo characteristics such as time, Global Positioning Satellite ("GPS") location, tags and other metadata, and visual similarity. In general, the initial layout attempts to place similar photos near each other while photos that are different are placed away from each other. Users create groups of similar or related photos and placing them in the workspace. As stacks are created, the system identifies photos that are close to a stack and indicates their potential inclusion in that grouping by placing them in the stack's neighborhood, or region of influence. Photos that are close to more than one stack are placed in the neighborhood of the stack to which they appear to be the closest. The system visualizes overlap in potential neighborhood membership by color-coding other stack neighborhoods by the degree of potential overlap with the current stack neighborhood. Based on this feedback, the user can rearrange the workspace by moving and adding photos to existing stacks, creating new stacks, and explicitly adding or removing photos from stack neighborhoods.

Neighborhoods of stacks act as implicit queries for photos similar to the stack forming the neighborhood. By adding or removing photos from a stack, the implicit query is modified. When switching to a different distance measure, the neighborhood of a stack is determined by that distance measure. To combine different distance measures in the implicit query of a stack, the neighborhoods can be partially or completely frozen to prevent photos from either entering or leaving. When photos are prevented from entering, the actual neighborhood forms the intersection of the potential neighborhood for different distance measures. Conversely, when photos are prevented from leaving a neighborhood, the neighborhood forms the union of potential neighborhoods.

For the rest of this document, the discussion focuses on the use of photographs. However, this approach can easily be applied to other multimedia documents such as videos and any type of document such as text files. Each file will have a visual representation in the form of a thumbnail image (e.g., a keyframe for a video). Their similarity can be expressed with appropriate distance measures.

To help users organize photographs into meaningful groups in a workspace, the workspace maintains an almost fully connected graph that represents the desired distances between photos and stacks of photos based on their similarity. In the absence of stacks, the graph is fully connected, such that distance measures are computed between all thumbnails. Only photos with distance measures that fall within a selected distance threshold have connecting lines between the photos. Each stack neighborhood forms an independent graph that is fully connected within the neighborhood but not connected to anything else.

There are several reasons for using a graph layout model. First, because only distances are needed, a space with non-Euclidian distances can be used. Second, unlike self-organizing maps (see Kohonen, Teuvo; Self-organizing maps; 3 ed.; Springer-Verlag, Berlin; 2001), nodes can be placed in any position and not just in a grid or similar structure of cells. Third, a graph layout can take placements by the user into consideration. That differentiates it from approaches such as multi-dimensional scaling. In addition, by using a distance metric with partial derivatives that guide the direction in which the iteration moves, a satisfying state can be found quickly.

For determining the desired distances between nodes, different distance measures can be used. A simple distance measure is the difference in time between when two photographs were created. For photos, the use of such a distance measure would place photos taken at the same time near each other. If photos have location data, the geographic distance between the locations can be used as a distance measure. Such measure would place photos, videos, and text notes created at the same location near each other. In our instantiation, we have used a variety of different distance measures including time, geocode, and visual similarity of photos. Visual similarity can be determined in a variety of ways. In one embodiment, a color histogram or a color correlogram can be used. A color histogram is a representation of the distribution of colors in an image, derived by counting the number of pixels of each of a given set of color ranges in a typically two-dimensional (2D) or three-dimensional (3D) color space. A color correlogram computes the spatial correlation of pairs of colors as a function of the distance between pixels. Details regarding color histograms and color correlograms are well known in the related arts.

Basic Interaction

Users group photos into stacks by dragging photos on top of each other. Those stacks are treated as nodes in the graph layout just like individual photos. While photo stacks usually are created by the user, the system also offers the option to automatically cluster photos based on the provided distance measure and to place related photos into the same stack. That allows the user to have more photos in the workspace without producing too much clutter.

After a photo or a photo stack is dragged, it stays pinned in its new position. In this fashion, users may pin several stacks in different areas of the workspace to organize photos. Because pinned photos and photo stacks indicate the users intention, their effect on the overall graph layout is increased relative to the unpinned photos.

Unpinned nodes may have a short desired distance to more than one pinned node. If those pinned nodes are far apart, the unpinned photos will pile up along the straight line between the two pinned nodes. To address this issue, we introduce the concept of a neighborhood and unpinned nodes may be in at most one neighborhood. Neighborhoods move independently of the photographs and stacks not in the neighborhood.

The layout of the overall graph and the neighborhoods provides users with a view of the system's understanding of photograph similarity. Visualizations of the similarity among neighborhoods provide feedback on the relative ambiguity of the system understanding of user-defined categories.

Graph Layout

There are different approaches for creating a layout for the completely-connected graph that optimizes the distances between nodes with respect to the desired distances. For example, one could use a standard optimization algorithm that minimizes the squared differences between desired and actual distances.

For the initial implementation, we chose to use a force model for the graph layout. Such an approach optimizes the linear error of distances. The force is modeled by springs (Hooke's law). A spring is defined by a neutral length l and a constant k. Two nodes at distance d connected by a spring (l, k) are subject to the force $k*(d-l)$. Note that this is a repulsive force if $d<l$. Our spring model assumes a fully-connected spring system (i.e., a spring between every pair of nodes). The length of the springs at rest corresponds to the desired distance between the nodes. As discussed above, the graph might be partitioned into several sub-graphs that are only connected within each sub-graph.

FIG. 1 shows the initial layout 100 of a set of photographs in a workspace 102, with each photograph represented by a thumbnail image 104. Each node 106 is either an individual thumbnail image 104 or a stack of photos 122 (see FIG. 3). In one aspect, a spring model is used to determine the initial layout 100 of nodes 106 in which the spring system is in a state of minimal energy. Such a layout 100 places related nodes 108, 110, i.e., nodes with a small desired distance, near each other and unrelated nodes 110, 112, far apart from each other. Connecting lines 114 are drawn between similar photos.

To produce the initial layout 100, thumbnails 104 are placed in random locations and then iteratively moved in small increments until a state of low energy is reached. To avoid finding only a local minimum, we start the spring model in different random states and refine the state with the lowest energy after some iterations.

If additional photos are added to the workspace later, those are placed in random locations as well. Then only the newly added photos are iteratively moved to locations with lower energy. Only after the new photos have settled in satisfactory positions, old and new photos are moved iteratively to find an overall low energy state. This two-stage approach keeps old photos near the previous locations to minimize any disorientation for the user.

Distance Measures and Spring Lengths

Figure 2:
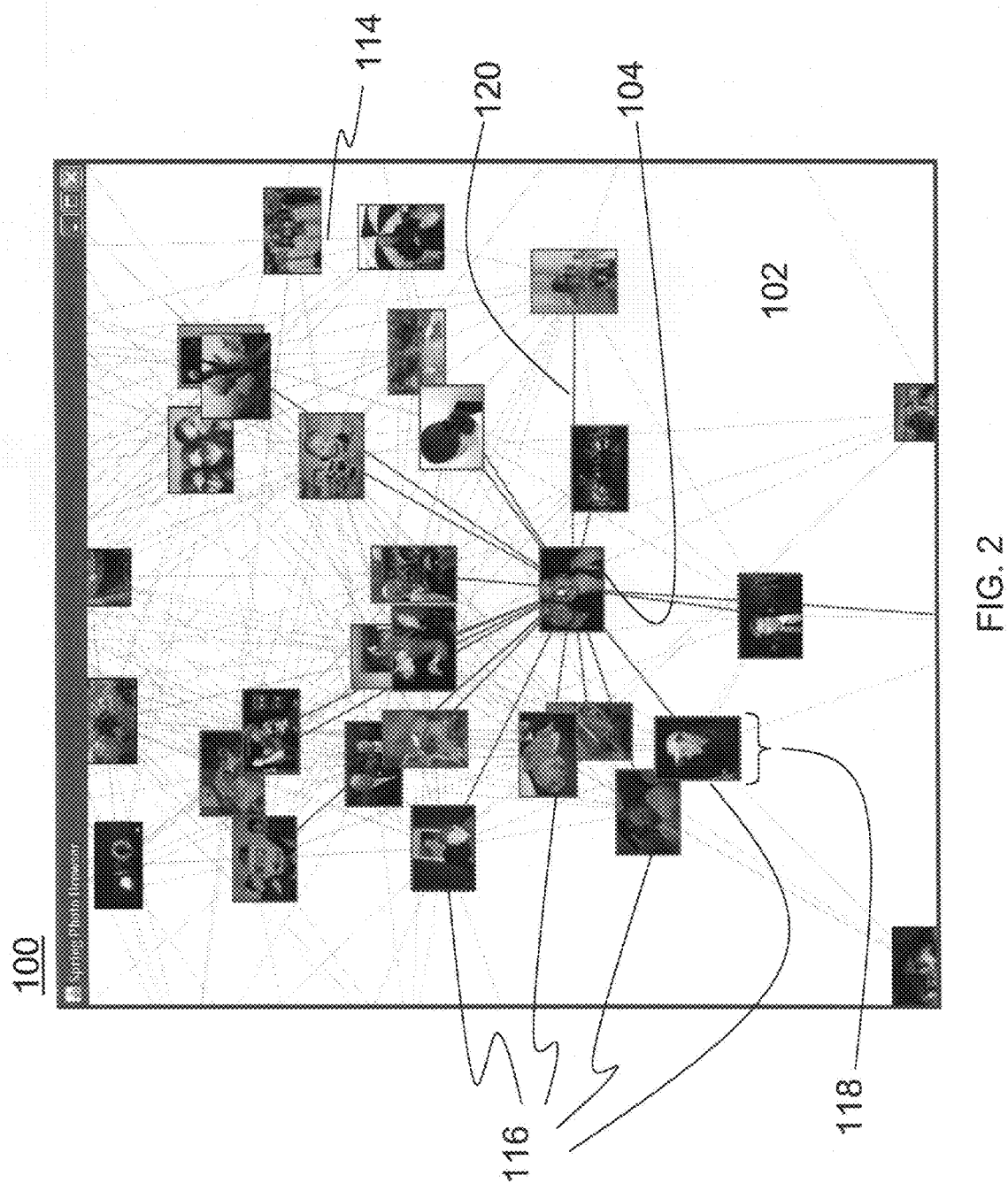
FIG. 2 depicts how selecting a single thumbnail image will highlight similar thumbnail images and the connections to those thumbnail images, according to one aspect of the invention.

In our instantiation, the neutral lengths of the springs are determined based on a similarity measure between photographs. A fully connected spring system with arbitrary spring lengths will over-constrain node positions in most cases. While a state of somewhat low energy can be found, this state will still have so much remaining energy that some nodes have to be placed in non-intuitive locations. We found that the situation improves if the lengths of springs have a fairly uniform distribution. FIG. 2 shows a close-up of an initial layout 100 of a graph with a single thumbnail 104 selected, resulting in similar photographs 116 becoming highlighted with a bold border 118 around the thumbnail 104. Highlighted connecting lines 120 between the selected photo and related photos are also developed. As can be seen, most of the similar photographs 116 are nearby but others are placed further away.

Normalization of distances is performed by sorting all pair-wise distances and by determining the percentile for each distance value. A desired distance at the 10 percentile of all distances would be assigned a spring length of 0.1 and a desired distance at the 80 percentile would be assigned a spring length of 0.8. This approach is sufficiently fast even with thousands of nodes. As an approximation, one could instead compute the mean and standard deviation of all pair-wise distances and use those as parameters for a normal distribution. From that normal distribution, we compute the cumulative probability for each distance value and assign that probability as a spring length.

To get a better separation between nodes, we specify a minimum spring length $l_{min}$. Spring lengths are modified using this formula: $l'=l_{min}+l*(l_{max}-l_{min})/l_{max}$ where $l_{max}$ is the maximum possible spring length between two nodes, usually 1 in a normalized space. Instead of specifying a minimum spring length, we could also add a repulsive force between each pair of nodes defined by a constant m. Two nodes at distance d that are repulsed by m are subject to the force $m/d^2$. Such a repulsive force could also be beneficial for stacks—to push photos not connected to them out of the way.

Stacks

Figure 3:
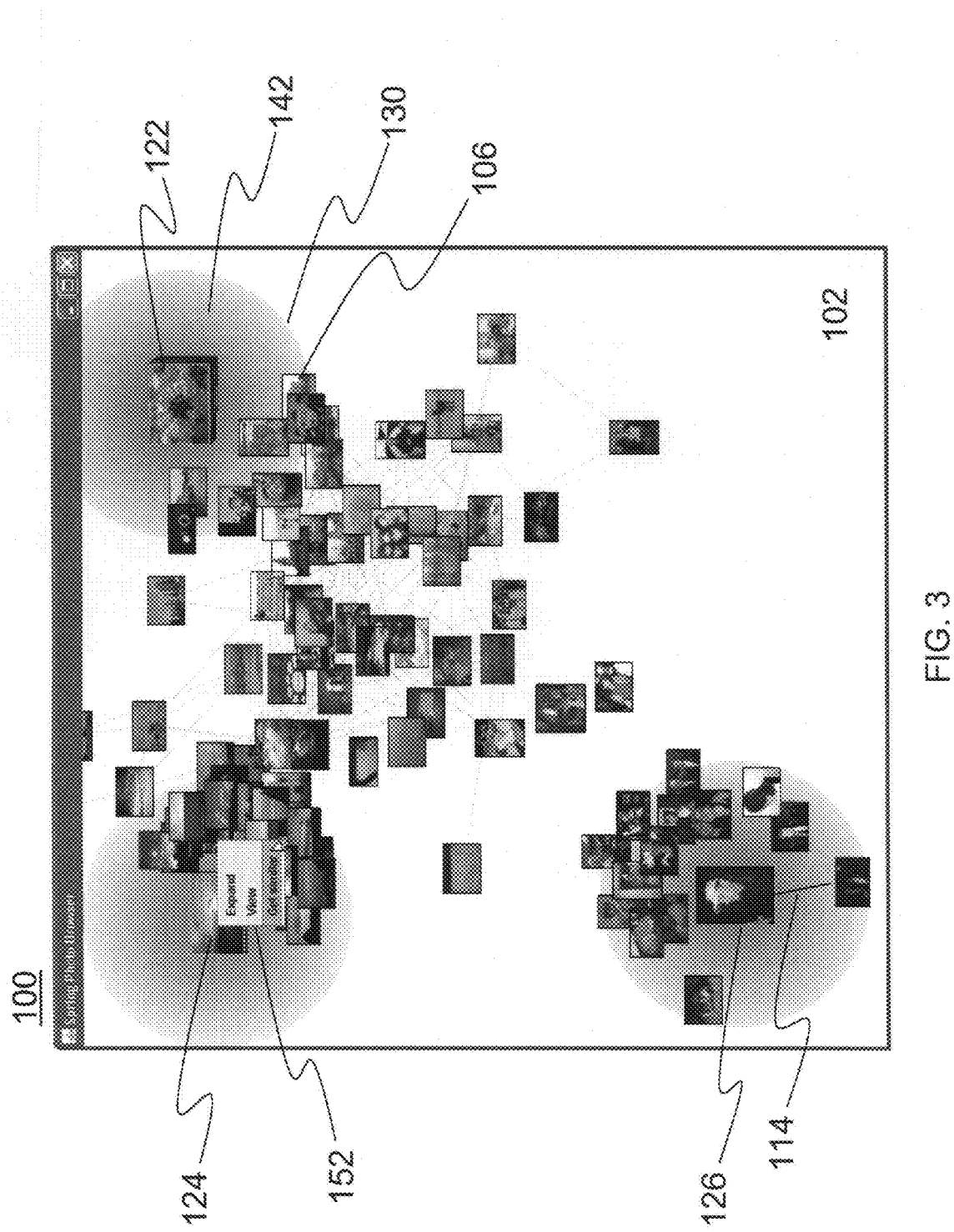
FIG. 3 depicts how similar files can be retrieved and placed in the workspace, according to one aspect of the invention.

Users may convert an individual photo into a stack that initially contains just that one photograph. Stacks are pinned in place. Creating stacks and adding photographs to stacks are the primary means for the user to organize the workspace. FIG. 3 shows a workspace 102 with three pinned stacks 122, 124, 126.

Creating a stack results in a new element in the graph layout that replaces the component photograph(s) and determines desired distances to other photographs and stacks. As more photos are added to a stack, the system adapts those distances. Our initial implementation used the average pair-wise distance between stack members and other graph nodes. Another measure commonly used in clustering is the maximum pair-wise distance.

Figure 4:
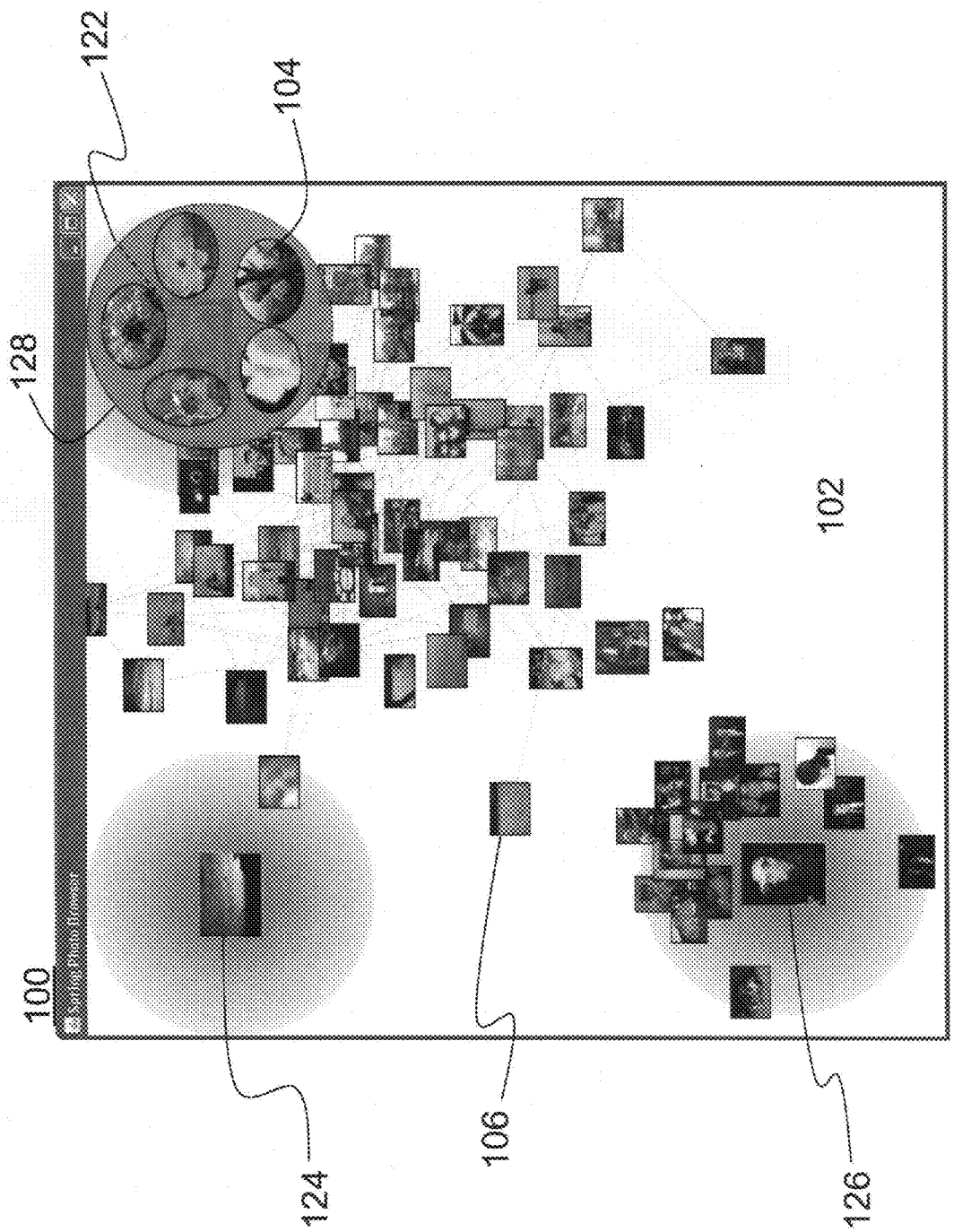
FIG. 4 depicts how three pinned thumbnail images or a stack of thumbnail images are indicated by larger thumbnails images, and how a neighborhood is indicated by a color-coded halo surrounding the thumbnail image of the stack that the neighborhood is based around, according to one aspect of the invention.
Figure 8:
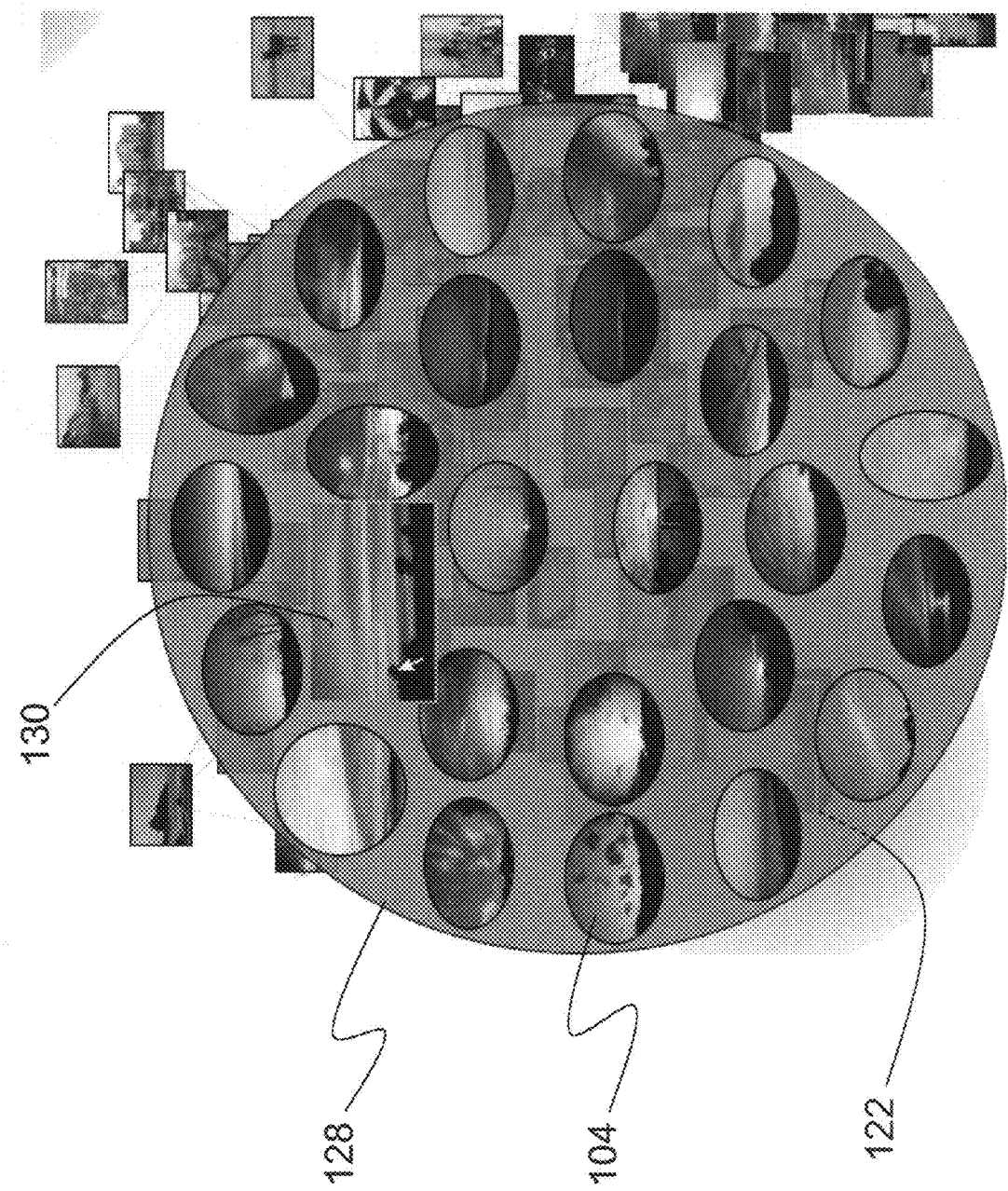
FIG. 8 depicts an elliptical popup window of a stack of thumbnail images and a set of ellipsoid thumbnails representing each thumbnail image in the stack according to one aspect of the invention.

Users can explore the members of a stack 122 by expanding it into an expanded view stack window 128, as illustrated in FIG. 8. This window 128 displays all thumbnails 104 in the stack 122 in a circular arrangement in one or more elliptical-shaped windows 128. To make thumbnails 104 fit better into the circular arrangement and for aesthetic reasons, we display just part of the photo by giving the thumbnail 104 an elliptical shape as well. When the user moves the mouse over one of these elliptical thumbnails 104, or surrogates, a large thumbnail 130 of the surrogate is provided to show more detail. Users may remove photos from a stack 122 by dragging thumbnails 104 outside the circle of the expanded view stack window 128. Photo stacks 122, 124, 126 and individual photographs may be viewed with a conventional viewer (not shown) that pops up in the workspace 102 and allows the user to flip through all elements in a stack. FIG. 4 further illustrates an expanded view stack window 128 in perspective of the initial layout 102 and the entire workspace 100.

Dragging and Pinning Photos and Stacks

Positions of stacks 122 in the workspace 102 are "pinned" so that the spring system cannot move them to different positions. Instead, the spring forces move all the unpinned nodes 106 to new positions. In response to every mouse-drag event, all other node positions are iteratively adjusted until the spring system is again in a state of low energy. Because the spring system uses partial derivatives for the spring forces, it is computationally easy to determine the direction into which a node 106 has to move to lower the total energy of the system. Because of this feature, a new layout 100 can be computed in a fraction of a second for hundreds of nodes so that it is feasible to compute these layout changes interactively in response to the user's mouse movements.

In one aspect of the invention, when users pin stacks 122 in a certain position, they are specifying how those photos relate to their current activity. This user action should have a greater effect on the layout 100 of the workspace 102 than the system's initial assessments of photograph similarity. To take this user action into account while still including some notion of photograph similarity, the system increases the strengths of the springs attached to user-defined stacks. In our experiments, we found that initially strengthening the springs of stacks by a factor of 15 produced good results, although the system includes a slider for the user to adjust this factor. When the user pins or unpins a node, other nodes move to new locations because of the adjusted spring strength and the neighborhoods described below. This move to new locations is shown as an animation so that the user can see where nodes move.

Neighborhoods of Stacks

To enable interaction with sets of similar photos without affecting the layout 102 of the entire workspace 100, a neighborhood of influence 130 is defined for each stack 122, 124, 126, as illustrated in FIG. 3. We define a threshold $d_n$ that describes the maximum distance between a photograph and a stack 122 such that the thumbnail 104 of the photograph belongs to the neighborhood 130 of the stack 126. If a photograph would belong to more than one stack neighborhood 130, it is initially assigned to the neighborhood 130 of the closest stack 122.

Figure 5:
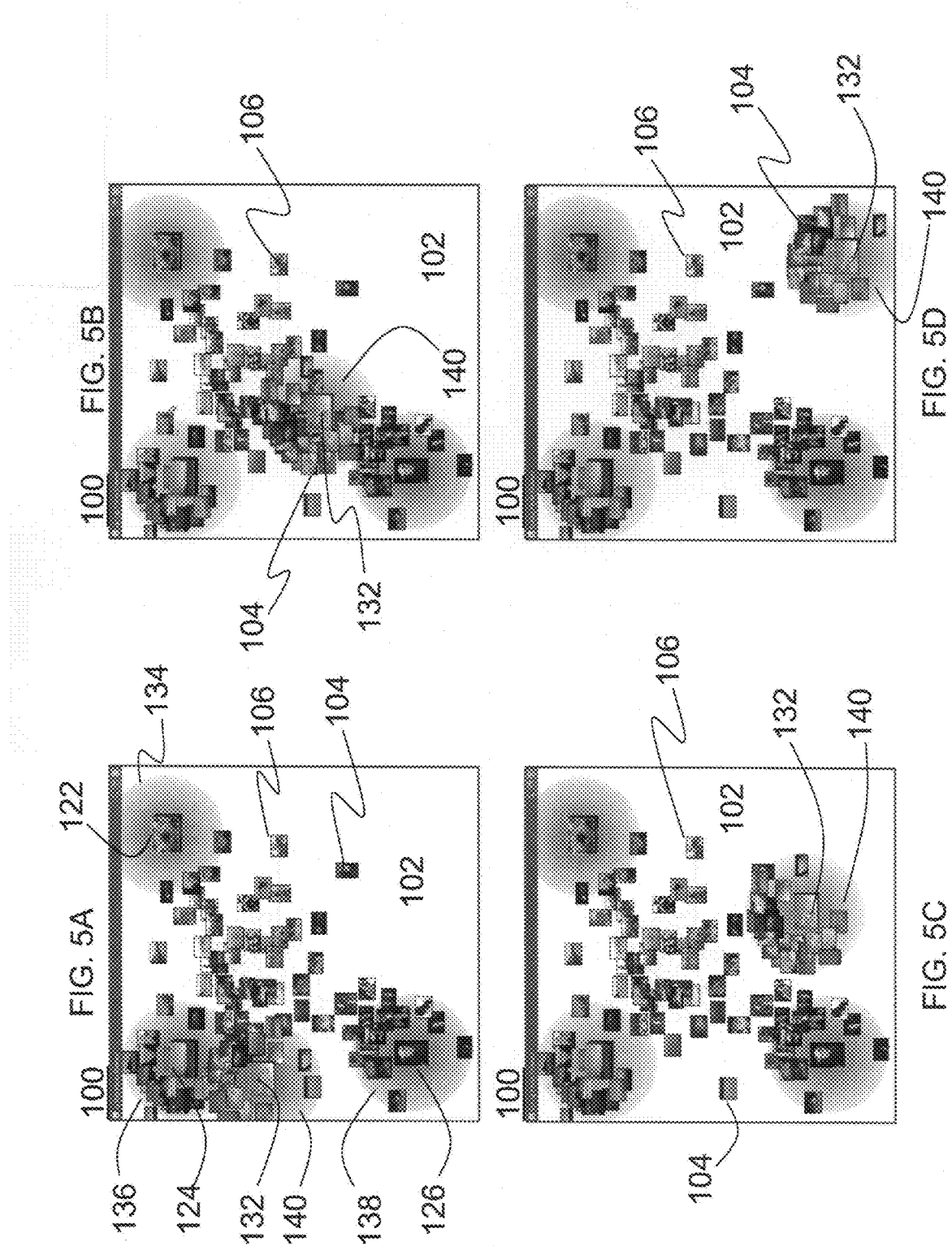
FIGS. 5A-5D depict a sequence of steps showing the creation of a new neighborhood with a red halo, and the movement of the neighborhood independent from the rest of the workspace, according to one aspect of the invention.

For each neighborhood 130, all spring connections 114 leading out of a neighborhood 130 are cut. This has the effect that a stack 122 can be dragged to a new location and all the thumbnails 104 in the neighborhood 130 follow but nothing else is affected. The process of moving a neighborhood 130 to a new location is illustrated in FIGS. 5A-5D. In FIG. 5A, the initial layout 100 of a workspace 102 is illustrated, with existing stacks 122, 124, 126 and new stack 132. Each stack includes a corresponding neighborhood 134, 136, 138 and new neighborhood 140. In FIG. 5A, stack 132 and neighborhood 140 are cluttered next to stack 124 and neighborhood 136, so to more clearly view new stack 132 and neighborhood 140, the user can drag stack 132 across the workspace 100, as shown in incremental steps in FIGS. 5B, 5C and 5D. Throughout FIGS. 5B-5D, it is apparent that stack 132 is taking along all thumbnails 104 that meet the distance threshold requirement for neighborhood 140. In FIG. 5D, it is also evident that the movement of stack 132 and neighborhood 140 had no effect on the positions of stacks 122, 124 or 126 or their corresponding neighborhoods 134, 136 and 138. Furthermore, thumbnails 104 acting as individual nodes 106 and not assigned to any neighborhoods were similarly unaffected by the movement of stack 132 and neighborhood 140. Therefore, the user is able to organize certain classes or categories of photos without affecting the existing classes, categories or relationships of files in the initial layout 102.

The distance threshold $d_n$ can be selected such that, on average, each node is connected to a percentage of all nodes (e.g., 20%). Instead of using a fixed percentage, the threshold can also be adjusted with the number of nodes. A percentage proportional to the inverse square root of the number of nodes works well.

"Sticky" and "Frozen" Neighborhoods

To avoid frequent movement between neighborhoods and to be able to combine different distance measures in forming a neighborhood, neighborhoods can be made sticky or frozen. Sticky neighborhoods retain neighbors even if a better neighborhood is available to them, as long as the neighbors still meet the distance criterion. In frozen neighborhoods, neighbors cannot leave even if they exceed the distance criterion. In one non-limiting example, neighborhood memberships can be "sticky" so that a photograph stays in its initially assigned stack neighborhood even if another stack is now closer, for example, because additional photos were added to that stack. The photographs are prevented from leaving their current neighborhood even when there is a more suitable neighborhood. Only if the distance of a photograph to its neighborhood stack exceeds the distance threshold $d_n$ would the photograph leave the neighborhood and either join another neighborhood or become part of the layout. Users may temporarily freeze neighborhoods so that photographs will not leave even if their distance exceeds the threshold. Unaffiliated photographs may still be added to a frozen neighborhood. With frozen neighborhoods, photographs keep accumulating in those neighborhoods. This can be used when organizing the workspace by different similarity measures. For example, first the visually similar photos may join a neighborhood, then the temporally similar ones, and finally the spatially similar ones.

In one aspect, the system visualizes photographs that would fit better in a different neighborhood and the user may choose to release them. For example, in FIG. 3, a popup menu 152 may appear over a neighborhood when the user highlights a photograph within that neighborhood. The popup menu 152 may provide options to release the selected photograph from the neighborhood, in which case the photograph will move back into the layout 102 or to another neighborhood where it fits more appropriately. If the photograph is currently residing in the best neighborhood available for that photograph, the release option could be grayed out to indicate to a user that no movement is needed.

Users may explicitly add or remove photographs to or from a neighborhood. Added photos will stay in the neighborhood regardless of distances. Removed photos will never automatically join that neighborhood.

Each stack 122 is surrounded by a neighborhood 130 that is visualized as a circular halo 142, as illustrated in FIG. 3. The radius of the halo 142 equals the distance threshold of the neighborhood 130 described above. This provides a quick visual indication to the user as to which nodes 106 are in the neighborhood 130 of a pinned node 106. Additionally, spring connections 114 no longer than the neighborhood distance threshold are drawn as faint lines. Because nodes 106 are fully connected with the exception of neighborhoods 130, there is no reason to display all spring connections 114. On mouseover of a pinned or unpinned node 106, all spring connections 114 to that node 106 within the distance threshold and the nodes 106 connected via those connections 114 are highlighted, as shown in FIG. 2. The above-described visualization provides another means for the user to see close connections.

Figure 6:
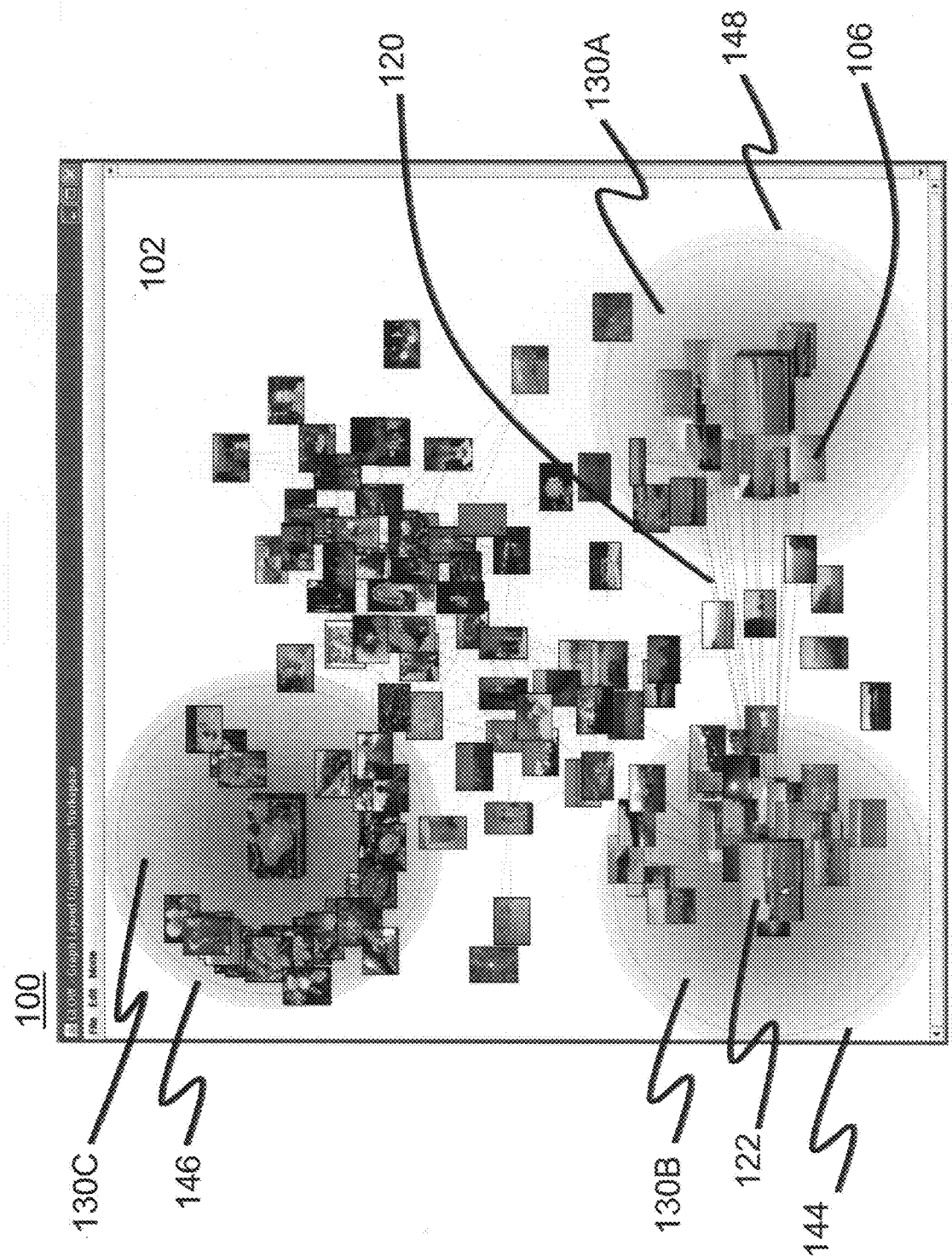
FIG. 6 depicts the relationships between neighborhoods and photographs in different neighborhoods using the color-coded halos and color-coded connecting lines, according to one aspect of the invention.

In a default situation, all halos 142 are of the same color (blue in the current implementation). When the user selects or moves the mouse over a neighborhood 130B, the halo colors of all neighborhoods 130A, 130C are adjusted to show how related the other neighborhoods are to that neighborhood 130B, as illustrated in FIG. 6. Closely related neighborhoods are shown with a red halo 144 and mostly unrelated neighborhoods 130C are shown with a blue halo 146. Neighborhoods with relationships in between the closely related and mostly unrelated nodes are represented by colors in between, such as the grayish red halo 148 surrounding neighborhood 130A or a grayish blue halo (not shown). As discussed above, photos can only belong to one neighborhood 130 even if they are similar to several stacks. For determining how related two stacks are, we look at the number of photos that could belong to both neighborhoods because they meet the distance threshold test. In one embodiment of the invention, the similarity of two neighborhoods is measured with the Jaccard coefficient, i.e., the size of the intersection of neighborhoods divided by the size of the union of neighborhoods. This visualization indicates which stacks are closely related from the system's view, thus these are likely locations of confusion where the user should look for elements that have been assigned to the wrong neighborhood by the system.

In another embodiment, photographs 106 in one neighborhood 130A that could belong in a similar neighborhood 130B can also be visualized with highlighted connecting lines 120 connecting photographs 106 in neighborhoods 130A to stack 122 of neighborhood 130B, as shown in FIG. 6. Alternate embodiments could include connecting photographs between related neighborhoods in addition to just connecting the stack with related photographs.

Figure 7:
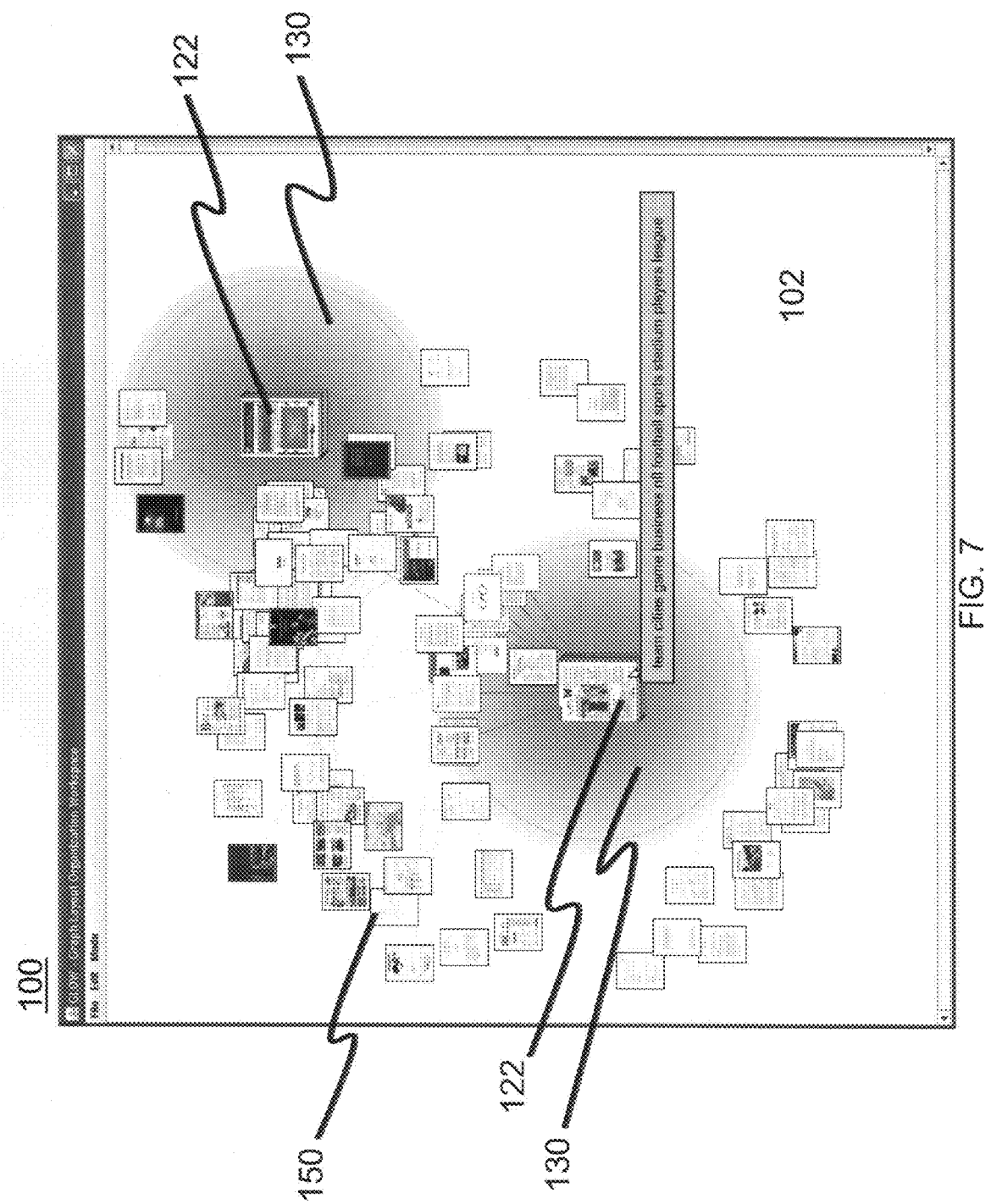
FIG. 7 depicts a layout of text documents arranged into neighborhoods, according to one aspect of the invention.

FIG. 7 represents one embodiment of the system where the relationships of text-based documents 150 can be visualized instead of photographs. Stacks 122 of documents 150 and neighborhoods 130 are all similarly organized, and each document 150 is visualized by a thumbnail image of the first page of a document. As depicted in FIG. 7, the documents 150 can include spreadsheets, graphs, web pages or images within the text-based documents. One skilled in the art will appreciate that the text in each document can be used to determine the distance relationships between documents in much the same way that the time, geocode and visual aspects were used to sort photographs in the previous embodiment.

Zooming in the Workspace

Users can zoom in or out of the workspace 100. If distances between thumbnails and thumbnail image 104 sizes were adjusted by the same zoom factor, users would not be able to separate overlapping photos. On the other hand, if the zoom factor only applied to distances between thumbnails and the image 104 sizes remained constant, users could not get a better look at the thumbnail images 104. To address this issue, the system includes two different zoom factors for distances between thumbnails and thumbnail images sizes 104. In particular, the system uses the square root of the workspace zoom factor as the zoom factor for the thumbnails 104. For example, if distances between photos are increased by a factor of 4, thumbnail sizes 104 are only increased by a factor of 2.

Requesting Additional Photos

Users may retrieve additional photos from outside the workspace 100 that are similar to a stack 122 using any of the offered similarity measures (visual, temporal, spatial). The retrieved photos initially join the neighborhood 130 of the stack 122 that was used to retrieve them, but the user may release them to let them move to a different neighborhood 130. FIG. 3 illustrates a popup menu 152 that can be displayed over a stack 124 to request that additional, similar photos be located and added to the workplace 100. For example, the user may be running a computer program implementing the described invention and be organizing only a fraction of photographs stored on the user's computer. If the user wants to organize additional related photos that are located on the user's computer hard drive, but which were not previously included in the workspace, the user can select the "Get similar" option on the popup menu 152 to have the computer program product search the hard drive for additional related photos.

Adapting Distance Measures

The iterative process of establishing user-defined categories relies on the workspace adapting in response to user actions. The spring layout with neighborhoods is a simple form of adaptation where images similar to the elements of a stack are moved to be near that stack and potential overlap between neighborhoods is visualized to the user. More complex forms of adaptation are employed to develop specialized distance metrics for each stack and to redefine the overall distance measure based on the stacks created.

One method for redefining the distance metric of a stack was explained previously as the average pair wise distance to photos in the stack. As new photos are added to this stack, this distance changes to reflect the user's definition. Another method would be to assume a probabilistic model for photos in the stack, for example a Gaussian distribution. The distance of a photo to the stack would then be the negative log of the probability of the photo based on the Gaussian model for the stack. The mean and covariance matrix for the Gaussian model are estimated based on photos in the stack, and are updated as new photos are added (or taken away from) the stack. Assume that we use a range of features to describe the photo, namely time, geographic distance, and color correlograms or concept vectors. Then as the Gaussians are updated based on photos the user adds to the group, the distance will automatically reflect the user's intention to group by one or more of these categories by weighting features with small variance more highly. Other adaptive learning techniques for the stacks may also be used.

A more heuristic way to accomplish this is the redefinition of the distance metric of a stack based on the features that are most representative of the elements of that stack. To identify these features, the system compares the mean (and standard deviation) of each feature for the subset of images in the stack and compares these to the mean and standard deviation for the photo collection as a whole. Features whose means are more than one standard deviation above the collection's features have their weights increased in the calculation of desired distance to the stack. For example, one stack could end up with a weight of 0.8 for the visual distance and 0.1 each for temporal and geographic distance. Another stack could have a large weight for geographic distance. While features that are more than one standard deviation below the mean could be included, implicit negative evidence produces more "false positive" indications of user goals due to the wide variety of elements that can happen to not be in the current subset accidentally.

Because each stack ends up with its own distance metric, the workspace can effectively represent categories that use widely varying subsets of the feature space for their definition. Thus, time, location, visual similarity, face detection, and other characteristics can be included in some distance calculations and not in others.

Scenarios

The ability to interactively cluster photographs can be beneficial in a variety of tasks. The following scenarios describe the workspace in use for locating photos for a presentation, for attaching metadata to a set of photos, and for organizing a photo collection.

Locating Photos for Presentation

When selecting photos to send to friends and family and when selecting photos to provide an overview of a topic, people often need to identify categories of photos they want to include in the presentation and then select a limited number from each category.

As described, the workspace facilitates the creation of categories that are based on different image characteristics. Thus, photos from a trip to Rome might be categorized into photos of the Coliseum, photos of people, photos of fountains, etc. The user wishes to include one or more photo from each category to provide a representatively diverse view of the trip.

These categories have different defining characteristics. Geographic location and the time the photos were taken are likely to be strong features for the photos of the Coliseum but not for the other categories. Similarly, features based on face detection are strongly tied to photos of people but not the other categories. Photos of fountains might be best characterized by visual features.

As the user creates categories for the types of photos she wants in the final presentation and provides examples, the system adapts the space based on the redefined distance measures based on the common features for the different categories.

Attaching Metadata to Photos

Similar to the above scenario, tags and metadata for photos are based on different image characteristics. Photographs of the golden gate bridge are likely to have a strong location feature, while photos of New Year's Eve celebrations would have a strong time feature, and photos of sunsets have strong visual features. As categories are defined and the workspace adapts, users can assign tags/metadata to the elements in a category and selected photos in the region of a defined category.

Overviews of a Photo Collection

As photo collections move onto the computer and Internet, tools are needed to manage these collections. In particular, curators must come up with strategies for organizing collections based on characteristics that support the use of the collection. A component of supporting use is presenting an overview of the contents of a collection so visitors can rapidly determine if the collection is likely to have materials that match their needs.

Collage, montage, and other visualization techniques have been explored as methods to support "collection understanding", providing the user with a sense of the value of the collection to their task. Chang, M., Leggett, J., Furuta, R., Kerne, A., Williams, J. P., Burns, S., Bias, R. (2004). "Collection Understanding", Proceedings of the ACM/IEEE Joint Conference on Digital Libraries, pp. 334-342. These methods tend to rely on the selection of photos from the collection in hopes that they will be representative of the collection as a whole.

The workspace described provides two alternatives for the support of collection understanding. Visitors could use the workspace to move photos around based on their current interests and the system can manipulate the layout and support the pulling of more images into the space based on their interests. Another approach is for the curators of a collection could to create one or more authored workspaces providing alternate views of their collection that give a sense of the contents of the collection. These workspaces would be interactive, allowing the visitor to start with the curator's categorization and move to categories that better match their current activities.

Figure 9:
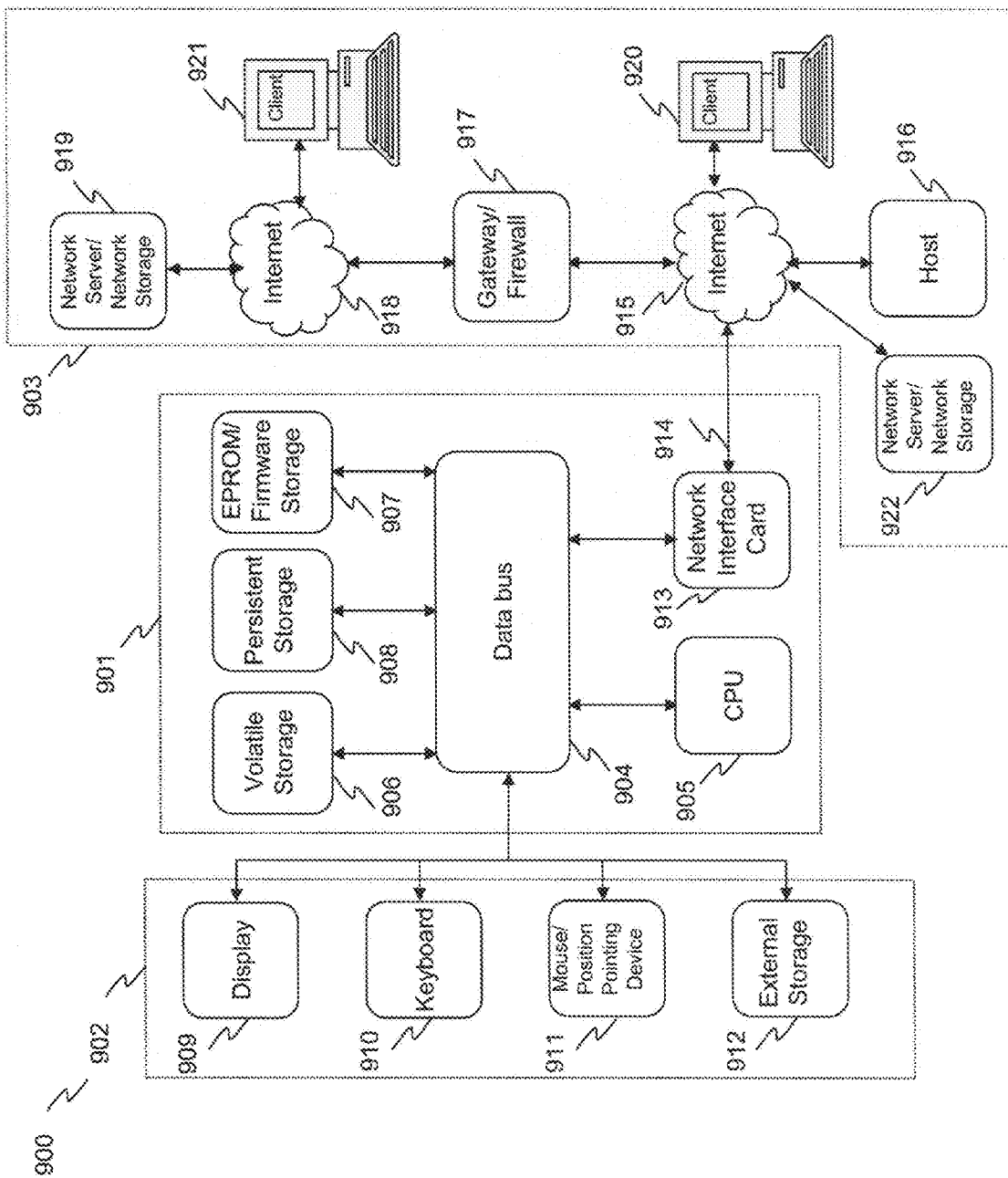
FIG. 9 illustrates an exemplary embodiment of a computer platform upon which the inventive system may be implemented, according to one aspect of the invention.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 908, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 920, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line. As another example, communication interface 913 may be a local area network interface card (LAN NIC) to provide a data communication connection to a compatible LAN. Wireless links, such as well-known 802.11a, 802.11b, 802.11g and Bluetooth may also be used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Although various representative embodiments of this invention have been described above with a certain degree of particularity, those skilled in the art could make numerous alterations to the disclosed embodiments without departing from the spirit or scope of the inventive subject matter set forth in the specification and claims. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. Also, various aspects and/or components of the described embodiments may be used singly or in any combination in the multimedia organization system. It is intended that all matter contained in the above description or shown in the accompanying drawings shall be interpreted as illustrative only and not limiting.

What is claimed is:

1. A method for organizing a plurality of files in a visual workspace, comprising the steps of:
   loading the plurality of files into a visual workspace, wherein each file is represented by a thumbnail image;
   creating a graph-based layout of the plurality of files in the visual workspace, wherein the files are connected, such that each file is separated from each other file by a distance corresponding to a similarity between each file and each other file;
   defining at least one stack of files from the plurality of files, wherein the stack of files comprises at least two files of the plurality of files in the visual workspace;
   forming a neighborhood of files surrounding the at least one stack of files and removing connections from the plurality of the files within the neighborhood to all of the plurality of the files in the visual workspace outside of the neighborhood, such that a plurality of the files are within the neighborhood and a plurality of files in the visual workspace are outside of the neighborhood, wherein the plurality of files within the neighborhood are connected with each other but not connected to the plurality of files outside of the neighborhood;
   forming the neighborhood by selecting a distance threshold to define which files are included within the neighborhood based on whether they are within the distance threshold;
   modifying the distance threshold after the neighborhood has been created; and
   preventing files from leaving the neighborhood even when there is another more suitable neighborhood based on the distance threshold.

2. The method of claim 1, further comprising selecting the plurality of files in the visual workspace from a group consisting of images, videos or text-based documents.

3. The method of claim 1, further comprising calculating the distance between files using a distance measure based on a similarity measure.

4. The method of claim 3, further comprising calculating the graph layout using a spring model such that the distance between each file is represented by the performance of at least one spring that is attached between the at least one stack and the files within the neighborhood of the at least one stack.

5. The method of claim 4, further comprising increasing a strength of the at least one spring attached between the at least one stack and the files within the neighborhood of the at least one stack.

6. The method of claim 1, further comprising preventing files from leaving the neighborhood even when they are no longer within the distance threshold.

7. The method of claim 1, further comprising preventing files from entering the neighborhood even when they are within the distance threshold.

8. The method of claim 1, further comprising forming a plurality of neighborhoods, and illustrating similarities between the neighborhoods in the plurality of neighborhoods.

9. The method of claim 8, further comprising illustrating the similarities between the neighborhoods in the plurality of neighborhoods where files within one neighborhood could be members of another neighborhood.

10. The method of claim 9, further comprising illustrating the similarities using color-coded halos surrounding the neighborhoods.

11. The method of claim 10, wherein the color-coded halos surrounding the neighborhoods comprise a color in a center of the color-coded halos and a lighter gradation of the color as a distance is increased from the center of the color-coded halos.

12. The method of claim 10, wherein adjacent neighborhoods to the formed neighborhood based on the distance threshold have a color-coded halo of a first color, and neighborhoods not adjacent based on the distance threshold have a color-coded halo of a second color.

13. The method of claim 1, further comprising magnifying a section of the visual workspace to more clearly visualize lines between the files in the section.

14. The method of claim 13, further comprising disproportionately increasing the distances between files while increasing the size of the thumbnail image of the files in the section when magnifying the section of the visual workspace.

15. The method of claim 1, further comprising organizing the files of a stack into an elliptical window, and further shaping each thumbnail image of the stack into an elliptical shape within the elliptical window.

16. The method according to claim 1, wherein when files are added to the at least one stack of files, a distance between the at least one stack of files and other files and stacks in the visual workspace is updated.

17. A system for organizing a plurality of files in a visual workspace, comprising:
   a loading module embodied on a computer with a processor and a memory, for loading the plurality of files into a visual workspace, wherein each file is represented by a thumbnail image;
   a layout module for creating a graph-based layout of the plurality of files in the visual workspace; wherein the files are connected, such that each file is separated from each other file by a distance corresponding to a similarity between each file and each other file;
   a stack module for defining a stack of files from the plurality of files, wherein the stack of files comprises at least two files of the plurality of files in the visual workspace;
   a neighborhood module for forming a neighborhood of files surrounding the stack of files and removing the connections from the plurality of the files within the neighborhood to all of the plurality of the files in the visual workspace outside of the neighborhood, such that a plurality of the files are within the neighborhood and a plurality of files in the visual workspace are outside of the neighborhood, such that a file can only belong to one neighborhood, wherein the plurality of files within the neighborhood are connected with each other but not connected to the plurality of files outside of the neighborhood,
   wherein the neighborhood module forms the neighborhood by selecting a distance threshold to define which files are included within the neighborhood based on whether they are within the distance threshold,
   wherein the neighborhood module modifies the distance threshold after the neighborhood has been created, and
   wherein the neighborhood module prevents files from leaving the neighborhood even when there is another more suitable neighborhood based on the distance threshold.

18. The system of claim 17, wherein the neighborhood module prevents files from leaving the neighborhood even when they are no longer within the distance threshold.

19. The system of claim 17, wherein the neighborhood module prevents files from entering the neighborhood even when they are within the distance threshold.

20. A non-transitory computer-program product embodied on a non-transitory computer-readable medium for organizing a plurality of files in a visual workspace, further comprising computer code for:
- loading the plurality of files into a visual workspace, wherein each file is represented by a thumbnail image;
- creating a graph-based layout of the plurality of files in the visual workspace, wherein the files are connected, such that each file is separated from each other file by a distance corresponding to a similarity between each file and each other file;
- defining a stack of files from the plurality of files, wherein the stack of files comprises at least two files of the plurality of files in the visual workspace; and
- forming a neighborhood of files surrounding the stack of files such that a plurality of the files are within the neighborhood and a plurality of files in the visual workspace are outside of the neighborhood, and removing the connections from the plurality of the files within in the neighborhood to all of the plurality of the files in the visual workspace outside of the neighborhood, wherein the plurality of files within the neighborhood are connected with each other but not connected to the plurality of files outside of the neighborhood;
- forming the neighborhood by selecting a distance threshold to define which files are included within the neighborhood based on whether they are within the distance threshold;
- modifying the distance threshold after the neighborhood has been created; and
- preventing files from leaving the neighborhood even when there is another more suitable neighborhood based on the distance threshold.

21. A method for organizing a plurality of files in a visual workspace, the method comprising:
- loading the plurality of files into the visual workplace, wherein each file of the plurality of files is represented by a thumbnail image;
- creating a graph-based layout of the plurality of files in the visual workspace, wherein the files are connected, such that each file is separated from each other file by a distance corresponding to a similarity between the each file and the each other file;
- defining at least one stack of files from the plurality of files, wherein the at least one stack of files comprises at least two files of the plurality of files in the visual workspace;
- forming a neighborhood of files surrounding the at least one stack of files based on whether the neighborhood of files are within a distance threshold;
- adding additional files to the at least one stack of files; and
- preventing files from leaving the neighborhood of files even when there is another more suitable neighborhood based on a distance to the added additional files.

* * * * *